Patented Mar. 8, 1949

2,464,044

UNITED STATES PATENT OFFICE 2,464,044

MANUFACTURE OF META-PHENYLENE DIAMINE

Jonas Kamlet, New York, N. Y., assignor to Boyle-Midway Inc., New York, N. Y., a corporation of Delaware No Drawing. Application April 24, 1946, Serial No. 664,707

2 Claims. (Cl. 260—580)

This invention relates to a process for the manufacture of meta-phenylene diamine. More particularly, it relates to a process for the manufacture of meta-phenylene diamine by the hydrogenation of one or more monochlorinated meta-dinitrobenzenes in the presence of a hydrogenation and dehalogenation catalyst.

Meta-phenylene diamine forms white crystals which become darkish red on exposure to air; it has a specific gravity of 1.139, a melting point of 62°–63° C., and a boiling point of 284°–287° C. at 1-atmosphere pressure. It is widely used in the manufacture of azo dyestuffs, especially those of the Bismarck-Vesuvine Brown type, in the manufacture of sulfur dyes, in photography, as an analytical reagent, as a developing agent in printing and dyeing textiles, etc.

Numerous methods for the preparation of meta-phenylene diamine have been described in the literature. These may be summarized as follows:

1. By the reduction of meta-dinitrobenzene with metallic iron in an acidic medium.
2. By the reduction of meta-dinitrobenzene with other reagents, e. g. with:
    a. Copper and hydrochloric acid.
    b. Tin and hydochloric acid.
    c. Sodium hydrosulfite in the presence of trisodium phosphate.
    d. Electrolytically.
3. By the hydrogenation of meta-dinitrobenzene in the presence of a hydrogenation catalyst.
4. By the reduction of substituted meta-dinitrobenzenes, e. g. 2,4-dinitrochlorobenzene with sodium hydrosulfite in the presence of trisodium phosphate.
5. By the reduction of meta-nitroaniline.
6. By the catalytic reduction of meta-nitrophenylazo compounds.
7. By the reaction of resorcinol with ammonia or an ammonium salt at elevated temperatures in the presence of a catalyst.

A number of other procedures of minor significance have also been reported.

The only method for the manufacture of meta-phenylene diamine which has heretofore acquired technical significance is that based on the reduction of meta-dinitrobenzene with iron turnings in the presence of an acidic medium. This method is believed to account for all of the meta-phenylene diamine being manufactured today.

I have discovered that good yields of meta-phenylene diamine may be obtained by the hydrogenation of the monochloro-substituted meta-dinitrobenzenes, either singly or in admixture with each other, in the presence of a hydrogenation and dehalogenation catalyst and preferably under conditions whereby the formation of an acidic reaction product is avoided.

There are three monochloro-substituted meta-dinitrobenzenes. These are:

1. 2,4-Dinitrochlorobenzene, the alpha or stable form of which has a melting point of 50°–53° C., and the beta or labile form of which has a melting point of 43° C.; this compound is obtained as the primary end-product in the nitration of chlorobenzene.
2. 2,6-Dinitrochlorobenzene, having a melting point of 86°–87° C., and obtained as a by-product in the nitration of chlorobenzene.
3. 3,5-Dinitrochlorobenzene, having a melting point of 53°–55° C., and obtained by the chlorination of meta-dinitrobenzene in the presence of a chlorine carrier as a catalyst.

Each of these three compounds, as well as any mixture of two or more of these compounds, may serve as starting material for the process of the present invention. The first two of these compounds, viz. the 2 4- and 2 6-dinitrochlorobenzenes, are at present the more important ones, since they are produced in considerable amounts either as commercial products or industrial wastes. My invention is particularly adapted to be applied to them.

Although 2,4-dinitrochlorobenzene is a more complicated molecule than meta-dinitrobenzene, the former is usually manufactured from chlorobenzene in a single-step nitration, whereas the latter, for purposes of reagent economies, must usually be made by a two-step nitration of benzene. While the cost per weight unit of meta-dinitrobenzene is thus usually appreciably higher than that of 2,4-dinitrochlorobenzene, the cost per mole of meta-dinitrobenzene is usually close to that of 2,4-dinitrochlorobenzene. At the date of the present application, the quoted market prices are 18¢ per pound of meta-dinitrobenzene and 14¢ per pound of 2,4-dinitrochlorobenzene. On this basis one pound-mole (168 lb.) of the former would cost $30.24, while one pound-mole (203 lb.) of the latter would cost $28.42. These relative price relationships have obtained approximately for many years, and may therefore be employed to point up the fact that 2,4-dinitrochlorobenzene and meta-dinitrobenzene may be economically competitive starting materials for the manufacture of meta-phenylene diamine when approximately equivalent yields are obtained from each. Actually, under most conditions, 2,4-dinitrochlorobenzene is somewhat more advantageous as a raw material for this compound.

The present invention is particularly advantageous in utilizing by-products available in large volume and resulting from the manufacture of 2,4-dinitrochlorobenzene. The residues of this operation, after the separation of the 2,4-dinitrochlorobenzene, contain a substantial quantity of a eutectic of 2,4-dinitrochlorobenzene and 2,6-dinitrochlorobenzene, melting at about 38° C. This eutectic has had, as far as I know, no profitable outlet, but I have discovered that it may serve very satisfactorily as the raw material for the process of the present invention. Both 2,4-dinitrochlorobenzene and 2,6-dinitrochlorobenzene on reduction and dehalogenation yield one end-product, meta-phenylene diamine.

My discovery was unexpected. It has been considered that chlorine atoms ortho to other substituent groups of an ortho-para-directing nature are relatively difficultly removed by hydrogenation-dehalogenation reactions. Since there is little doubt that in the present invention the nitro groups are reduced to the ortho-para-directing amino groups before the halogen is split from the ring, the smoothness of the reaction and the high yields of meta-phenylene diamine obtained by applying my process to 2,4- and 2,6-dinitrochlorobenzenes and their eutectic mixtures were surprising.

One purpose of the present invention is, therefore, to provide a method whereby meta-phenylene diamine may be manufactured from a readily available raw material, having at present no satisfactorily profitable outlet.

Another purpose of the invention is to provide a simple and efficient catalytic method for converting chloro-meta-dinitro-benzene to meta-phenylene diamine.

Other purposes and advantages of my invention will be apparent from the following description.

According to my invention I use catalytically activated hydrogen for the reduction and dehalogenation of the monochlor-substituted meta-dinitrobenzenes whereby meta-phenylene diamine is obtained. As stated above, the two members of this group which are important either as commercial products or industrial wastes are the assymetric 2,4- and 2,6-dinitrochlorobenzenes. The application of my process to these compounds is represented by the following equations:

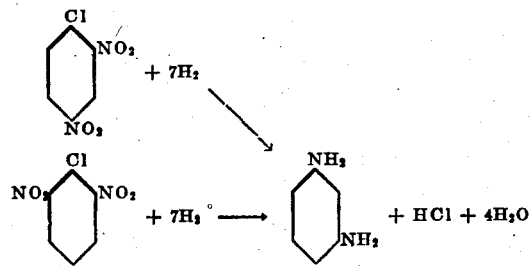

The symmetrical isomer, the 3,5-dinitrochlorobenzene, may also be converted to metaphenylene diamine by catalytic hydrogenation and dehalogenation. The catalyst is chosen from among those which are capable of effecting both dehalogenation and reduction. These include the noble metals, such as platinum and palladium, as well as various types of reduced nickel catalysts.

The catalyst which I have found most suitable for the process of the present invention is activated Raney nickel. This material is prepared from a comminuted aluminum-nickel alloy by leaching out the aluminum with an alkali solution, whereby the nickel remains behind in a spongy and catalytically highly active condition.

The reduction may be effected with hydrogen gas at room temperature or above, and at atmospheric or superatmospheric pressures. At higher temperatures and/or pressures, the reaction time is lower and better over-all yields are obtained. The upper temperature limit is the boiling point of the solution or suspension being treated at the pressure prevailing in the reaction zone. Preferred, although not critical conditions, are temperatures of 20° C. to 40° C. and hydrogen pressures of 5 to 10 atmospheres. Since Raney nickel catalyst is characterized by its exceptional activity at normal temperature and pressure, it is likewise feasible but less advantageous to effect this reaction at room temperature and pressure.

Dehalogenation with hydrogen in the presence of Raney nickel must be effected in the presence of a quantity of alkali sufficient to neutralize at least most of the hydrogen halide formed. This may be due either to a too small energy of activation for dehalogenation to occur in the absence of the alkali or to the poisoning of the nickel catalyst by the reaction of the first few molecules of hydrogen halide formed interacting with the nickel to form nickelous ions, whereby the reduction is terminated.

The alkali (preferably sodium or potassium hydroxide) may be added at the outset of the reduction-dehalogenation process. However, since an excess of alkali at the outset may tend to retard the initial hydrogenation, it is both feasible and advantageous to effect the reaction sequentially. Thus, the reduction may be effected in the absence of alkali until sufficient hydrogen has been absorbed in calculated amount for the reduction of the two nitro groups in the chlorodinitrobenzene. The theoretical amount of alkali is then added, and the hydrogenation is continued until complete dehalogenation has occurred. Since reductive dehalogenations, when effected in the presence of alkali, are exothermic because of the heat of neutralization of the hydrogen halide liberated, such sequentially effected reduction may be carried out at elevated temperatures for the initial (nitro group reduction) stage and at room temperature for the subsequent (dehalogenation) stage.

The reaction may be effected by dissolving the chlorodinitrobenzenes in methanol, ethanol or isopropanol, adding the catalyst and (optionally) the alkali and hydrogenating until the theoretical amount of hydrogen has been absorbed. Alternatively, the alkali may be added after the nitrogroup reduction has been effected, but before dehalogenation has occurred, as described above. The reaction may also be effected by emulsifying the chlorodinitrobenzenes in an aqueous medium with the optional aid of an emulsifying agent, and with vigorous agitation, and then proceeding as above. The emulsifying agent must, however, be of such a chemical nature as to remain unaffected under the conditions of the reaction. Inasmuch as the solvent may be recovered for reuse substantially quantitatively, it is preferable to use one of the lower aliphatic alcohols mentioned above as a medium for this reaction. In the claims I have used the expression "in liquid form" to include both solutions and suspensions of the mono-chloro-meta-dinitrobenzenes.

The following examples are intended to illustrate the present invention but not to limit it, the scope of the invention being defined in the appended claims.

In the examples all parts given are by weight.

Example I 202.5 parts of 2,4-dinitrochlorobenzene (1 mole) and 56.1 parts of potassium hydroxide (1 mole) are dissolved in 2000 parts of 95% ethanol. Hydrogenation is effected at about 35° C. and at a hydrogen pressure of five atmospheres in the presence of 10.0 parts of activated Raney nickel catalyst with vigorous agitation until 14.1 parts of hydrogen (7 moles) have been absorbed. The reaction mixture is then cooled to room temperature, filtered from insoluble material, and the solvent distilled off for reuse. The residual oil is purified by vacuum distillation. On chilling, the distillate solidifies to white crystals of meta-phenylene diamine, M. Pt. 62° C. The yield is 87.6 parts, or 81% of the theoretical.

Example II

A quantity of the by-product eutectic of 2,4-dinitrochlorobenzene manufacture, containing 202.5 parts (1 mole) of mixed 2,4-dinitrochlorbenzene and 2,6-dinitrochlorobenzene is dissolved in 2000 parts of methanol. Hydrogenation is effected at about 35° C. and a hydrogen pressure of 10 atmospheres in the presence of 10.0 parts of activated Raney nickel catalyst, with vigorous agitation, until 12.1 parts of hydrogen (6 moles) have been absorbed. The reaction is then discontinued and 40.0 parts of sodium hydroxide are dissolved in the mixture. Hydrogenation at 20° C. and ten atmospheres is then resumed until an additional 2.0 parts of hydrogen (1 mole) have been absorbed.

The reaction mixture is then filtered and the solvent distilled off. The residual oil, on cooling, solidifies to a mass of crystals of technical meta-phenylene diamine, assaying 94-95% $C_6H_4(NH_2)_2$. The yield is 91.2 parts, or 84.4% of the theoretical.

Example III 202.5 parts of 3,5-dinitrochlorobenzene (1 mole)), 40.0 parts of sodium hydroxide (1 mole) and 40.0 parts of activated Raney nickel catalyst are added to 2500 parts of isopropanol. Hydrogen is bubbled through a porous plate into the vigorously agitated reaction mixture at room temperature and pressure for a prolonged period, or until a test portion, freed of the solvent, dissolves in water without turbidity. The isopropanol is distilled off, and the residual oil purified as described in Example I. The yield of meta-phenylene diamine is 75.0 parts, or 69.4% of the theoretical.

I claim:

1. The process of manufacturing meta-phenylene diamine, which comprises hydrogenating and dehalogenating a eutectic mixture of 2,4- and 2,6-dinitrochlorobenzene by the following steps: dissolving the eutectic mixture in a lower aliphatic alcohol, suspending Raney nickel in the alcoholic solution, subjecting the solution and suspended nickel to intimate contact with hydrogen at a pressure not above about 10 atmospheres in the absence of air and at a temperature not below about 20° C. and not above the boiling point of the alcoholic solution at the prevailing pressure until the nitro groups present have been for the most part converted to amino groups, thereafter introducing into the solution an amount of a lower alkali metal hydroxide stoichiometrically equivalent to at least the major portion of the chlorine present, continuing intimate contact of solution and suspended nickel with hydrogen until the nitro groups in the eutectic mixture have been substantially completely reduced and chlorine substantially completely removed from the benzene ring, and recovering meta-phenylene diamine from the reaction mixture.

2. The process of manufacturing meta-phenylene diamine, which comprises hydrogenating and dehalogenating a eutectic mixture of 2,4- and 2,6-dinitrochlorobenzene by dissolving the eutectic mixture in a lower aliphatic alcohol, suspending Raney nickel in the alcohol solution, and subjecting the solution and suspended nickel to intimate contact with hydrogen at a pressure not above about 10 atmospheres in the absence of air, at a temperature not below about 20° C. and not above the boiling point of the alcoholic solution at the prevailing pressure, and in the presence of an acid-neutralizing substance, until the nitro groups present have been for the most part converted to amino groups and chlorine has been substantially eliminated from the benzene ring.

JONAS KAMLET.

REFERENCES CITED

The following references are of record in the file of this patent:

Winans: J. Am. Chem. Soc., vol. 61, pages 3564–3565 (1939). (Available Pat. Off. Library.)